United States Patent [19]

Tsuchihashi et al.

[11] Patent Number: 5,053,975

[45] Date of Patent: Oct. 1, 1991

[54] MASTER-SLAVE MANIPULATOR CONTROL

[75] Inventors: Akira Tsuchihashi, Nagareyama; Shinichi Takarada, Yokohama; Taro Iwamoto, Mito; Kichio Nakajima; Tatsu Aoki, both of Ibaraki; Hiroshi Yamamoto, Tsuchiura, all of Japan

[73] Assignee: Hitachi, Ltd., Tokyo, Japan

[21] Appl. No.: 363,071

[22] Filed: Jun. 8, 1989

Related U.S. Application Data

[63] Continuation-in-part of Ser. No. 123,276, Nov. 20, 1987, Pat. No. 4,853,874.

[30] Foreign Application Priority Data

Jun. 10, 1988 [JP] Japan .............................. 63-141712

[51] Int. Cl.⁵ .............................................. B25J 3/100
[52] U.S. Cl. ...................................... 364/513; 364/191
[58] Field of Search ................... 364/513, 191; 901/2, 901/3, 4, 14, 15, 19, 27, 28

[56] References Cited

U.S. PATENT DOCUMENTS

| | | | |
|---|---|---|---|
| 4,068,156 | 1/1978 | Johnson et al. | 364/513 |
| 4,385,358 | 5/1983 | Ito et al. | 364/513 |
| 4,613,943 | 9/1986 | Miyake et al. | 364/191 |
| 4,661,032 | 4/1987 | Arai | 364/513 |
| 4,853,874 | 8/1989 | Iwamoto et al. | 364/513 |
| 4,891,767 | 1/1990 | Rzasa et al. | 901/2 |

FOREIGN PATENT DOCUMENTS

0108511A3  5/1984  European Pat. Off. .

2297697  8/1976  France .

OTHER PUBLICATIONS

Katsuhisa Furuta et al., "Master-Slave Manipulator Based on Virtual Internal Model Following Control Concept," Proceedings 1987.
International Conference on Robotics and Automation, vol. 1, Apr. 1987, pp. 567–572.

*Primary Examiner*—Allen R. MacDonald
*Assistant Examiner*—George Davis
*Attorney, Agent, or Firm*—Fay, Sharpe, Beall, Fagan, Minnich & McKee

[57] ABSTRACT

After positional information of the master arm is transformed into first generalized world coordinates corresponding to positional information representing a calculated position of the slave arm, when a signal instructing an interruption of the associated operation between the master arm and the slave arm is received and then the positional relationships between the master arm and the slave arm connected thereto by use of an imaging device are updated, the first generalized world coordinates are transformed into the second generalized world coordinates based on the new positional relationships so as to restart the associated operation therebetween. The optimal control of the manipulator is conducted through matrix operations related to the change-over between imaging devices, the reset operation conducted in an area of the movable range of the master arm, and the alteration of the ratio between the movements of the associated operation.

10 Claims, 8 Drawing Sheets

MASTER-SLAVE MANIPULATOR CONTROL

CROSS-REFERENCE TO RELATED PATENT

The present application is a continuation-in-part to U.S. patent application Ser. No. 07/123,276 which was once entitled CONTROLLING APPARATUS OF MANIPULATOR filed on Nov. 20, 1987 by T. Iwamoto et al. and of which the entitlement was thereafter changed to MASTER-SLAVE MANIPULATOR WITH SCALING and issued as U.S. Pat. No. 4,853,874 on Aug. 1, 1989 and relates to the European patent application Ser. No. 87118387.7.

BACKGROUND OF THE INVENTION

The present application relates to a manipulator operated by a human operator, and in particular, to a control system of controlling a manipulator suitable for the human operator to accurately conduct jobs in an unbearable environment and in cosmic space.

The U.S. patent Ser. No. 3,909,600 issued to R. E. Hohn on Sept. 30, 1975 describes a first coordinate for operations of a manipulator of an industrial robot the first coordinate corresponds to the rectangular coordinate of a manipulator arm.

In the conventional manipulator, the complex operations of the manipulator are likely to depend on the skill of the human operator.

For example, in a master-slave configuration, a master arm and a slave arm are provided with the same shape or an analogous shape, which consequently leads to cases where the master arm is of a structure unsuitable for the human operation, where the dimension of the master arm is sometimes so great that the operator himself or herself becomes to be a hindrance of the operation of the master arm, and where fine operations cannot be conducted.

In addition, in a remote manipulation, the field of vision of the operator is interrupted by the manipulator and hence the operator is required to shift the head to the right and/or to the left for the manipulation. In consequence, for example, an industrial television (ITV) is employed in this situation; however, a sufficient field of vision cannot be attained by a single image from a television camera, and if many television cameras are arranged for this purpose, there appear variations in relationships between images and the manipulator, which causes in some cases a confusion of the human operator.

Recently, with a rapid advance of the computer technology, there has been employed a computer to control a manipulator and a robot so as to develop a highly developed control operation. As an example, as described in pages 40 to 45 of an article of T. Arai et al., "Bilateral Control for Manipulators with Different Configurators", 1984, IECON '84; there is used a computer which conducts an operation of a coordinate transformation at a high speed to establish the one-to-one correspondence between the movements respectively of a master arm and a slave arm having the different shapes, respectively. In this article, there have also been described a velocity and a transformation of a force associated with a Jacobian matrix.

In addition, in the JP-A-61-252081, there has been described a method in which even in a case where there exist differences of the position and attitude between a master arm and a slave arm and hence the relationship of the one-to-one correspondence cannot be established by achieving a projective transformation therebetween so as to obtain an origin shared therebetween, the correspondence can be attained only by means of the apparatus having the coordinate correspondence establish function.

In addition, there has been published a technology in which an animated image of a robot is produced by an animation technology so as to be imaged by use of an industrial television to enable the teaching of the robot by use of the animated image, thereby conveniently attaining the result, which is the same as that attained by actually operating the robot.

The convention technologies above are still confined in the respective narrow technological fields and cannot be regarded as a completely satisfactory system technology including the human operations which is configured through discussion of the manipulator from a comprehensive viewpoint.

For example, in the above case of the high-speed coordinate transformation technology, for the master arm and the slave arm, matching is established with respect to the respective rectangular coordinate points and the positions of the tips of the respective arms and hence the ratio of motion, that is ratio of the velocity or distance associated with each arm is fixed.

In consequence, in a case when a fine work is to be accomplished by means of the slave arm, it is necessary for the master arm to conduct a fine operation similar to the fine operation required for the slave arm; and conversely, in a case where a great action is to be taken by the slave arm, it is similarly necessary for the master arm to conduct a great action.

As described above, the operation of the slave arm imposes a heavy load on the human operator and the realizability of the work depends on the skill of the operator.

In addition to the load of the operator, there arises a psychological load imposed on the operator in a case where the operation is conducted by visually checking an image displayed on an industrial television screen so as to operate the master arm with a direction of a television camera taken into consideration.

The JP-A-61-252081 proposes an effective solution to solve the problem above. In this method, the master arm and the slave arm can be independently controlled such that the coordinate correspondence is later established. In consequence, although the correspondence can be established in a broad range, there may appear a danger as a result of a wrong correspondence thus established. In addition, for the correspondence established in association with industrial cameras, since the master arm and the slave arms are independently processed, there are required the respective correspondences to be established between the cameras and the master arm and between the cameras and the slave arm, namely, the operations become to be complicated and hence this method is not practical in some cases.

SUMMARY OF THE INVENTION

It is therefore an object of a manipulator control system which is capable of increasing the operability of a master arm to be easily controlled by the operator who uses many television monitor screens under a safe condition.

Another object of the present invention is to provide a master/slave control system in which the operability of a slave arm of a manipulator is improved through a simple operation and the operability of the manipulator itself is also increased as a result without causing any danger.

Still another object of the present invention is to provide a manipulator control system in which even if a zooming ratio of an image input device is arbitrarily changed, a ratio between a movement of a tip of the master arm and a movement of a tip of the slave arm on a television monitor screen can be kept retained.

The objects above is achieved according to the present invention in a system having a master arm to be handled by a human operator and a slave arm operating in accordance with a movement of the master arm by providing an arithmetic unit and a coordinate transformation instruct device for effecting, on generalized world coordinate information indicating position information of the master arm, a second coordinate transformation associated with a second generalized world coordinate for improving the operability such that a result of the second coordinate transformation is supplied to the slave arm.

The master arm to be handled by the operator is of a shape and of a size respectively suitable for the handling conducted by the operator. On the other hand, the slave arm has a size which enables the slave arm to move in a required operating space and has a structure suitable for manipulating objective parts. The system is constituted such that the operator takes the most relaxed posture for the operation and that there are arranged as many television cameras as are necessary for supplying sufficient visual information to the field of vision of the operator and the cameras are located to face the respective directions so as to clearly display many parts. In the field of vision of the television camera, since there exists a portion which is not clearly visible depending on a state of a light incident to the object, the system is configured to be capable of superimposing animated images onto a real image by use of an animation technology.

In order for the operator to satisfactorily use the system for objective jobs, the second generalized world coordinate transformation is achieved so as to match the direction of the master arm with the direction associated with the image display so that the operation ratios among the master arm, the slave arm, and the animation can be easily changed, that a parallel translation can be achieved for the master arm to operate within the control arm moving range, and that the operator is not confused even when the image is changed to another image obtained by a television camera facing a direction which is different the direction of the camera associated with the previous image.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Referring now to the drawings, description will be given of embodiments according to the present invention.

First, prior to the description of an embodiment according to the present invention, the operation principle of the present invention will be described with reference to FIG. 5. This diagram includes a master arm 101 and a slave arm 102, which are respectively of the different configurations in this example. Assume here that the rectangular coordinate system of the master arm 101 is represented as M with a base $O_m$ set to the origin thereof, a coordinate transformation matrix from the rectangular coordinate system M to the tip of the master arm 101 is $T_6^m$, the reference coordinate system of the slave arm 102 is represented as S with a base $O_s$ set to the origin thereof, a coordinate transformation matrix from the rectangular coordinate system S to the tip of the slave arm 102 is $T_6^S$, and a transformation matrix between the coordinate transformation matrices $T_6^S$ and $T_6^m$ is represented as $R_i^K$. In this situation, the arithmetic operations are achieved by setting $O_m$ and $O_S$ to the origin $O_g$ of the generalized world coordinate system so as to establish the one-to-one correspondence between $T_6^S$ and $T_6^m$. As a result, the tip of the master arm 101 matches with that of the slave arm 102, which will be described herebelow first on K.

Based on individual coordinate values $Q^m$ of parameters of links and angles of link connecting joints constituting the master arm 101, the coordinate transformation matrix $T_6^m$ at the tip of the master arm 101 can be obtained. Next, the operation of the coordinate transformation including the scale transformation and the parallel translation between the coordinate transformation matrix $T_6^m$ from the rectangular coordinate system M at the tip of the master arm 101 and the coordinate transformation matrix $T_6^S$ from the rectangular coordinate system S at the tip of the slave arm 102 is represented by the following equation (1).

$$T_6^S = K \cdot T_6^m \quad (1)$$

where, $K$ is $$K = \begin{bmatrix} a & 0 & 0 & d \\ 0 & b & 0 & e \\ 0 & 0 & c & f \\ 0 & 0 & 0 & 1 \end{bmatrix} \quad (2)$$

Under this condition, for $d=e=f=0$, $T_6^S$ is obtained by multiplying $T_6^m$ by a in the x-axis direction of the rectangular coordinate system M of the master arm 101, by multiplying $T_6^m$ by b in the y-axis direction thereof, and by multiplying $T_6^m$ by c in the z-axis direction thereof. For a uniform magnification or reduction in the directions of x, y, and z axes, it is only necessary to set a condition of $a=b=c$. To the transformation matrix $T_6^S$ obtained from the equation (1) above, the parameters of the slave arm 102 are assigned such that an inverse coordinate transformation is effected to obtain coordinate values $Q_s$ of angles of the respective axes of the slave arm 102. For the coordinate values $Q_s$ of the respective joint of the slave arm 102 thus attained, if the servo control is effected for each joint, the arm 102 can be operated, within the movable range of each arm, by arbitrarily magnifying or reducing the movement of the master arm 101 regardless of the shapes of the arms 101 and 102.

Next, in a case of $a=b=c=1$, $T_6^S$ is obtained through a parallel displacement effected on $T_6^m$ by distances d, e, and f in the directions of x, y, and z axes of the rectangular coordinate system M of the master arm 101. To the transformation matrix $T_6^S$ obtained from the equation (1) above, by assigning the parameters of the slave arm 102, there are computed individual coordinate values $Q_s$ of the respective joint of the slave arm 102 through an inverse coordination transformation. With the coordinate values $Q_s$ thus attained for the respective joint of the slave arm 102, by conducting the servo control for each joint, the operation can be achieved by arbitrarily shifting the reference point of the slave arm 102 relative to the reference point of the master arm 101. This shifting operation should be made slowly without any danger. The bases $O_m$ and $O_s$ can be made coincident with the common origin $O_g$ by the above mentioned magnification, reduction and parallel displacement which are called a first generalized world coordinate transformation.

Figure 2:
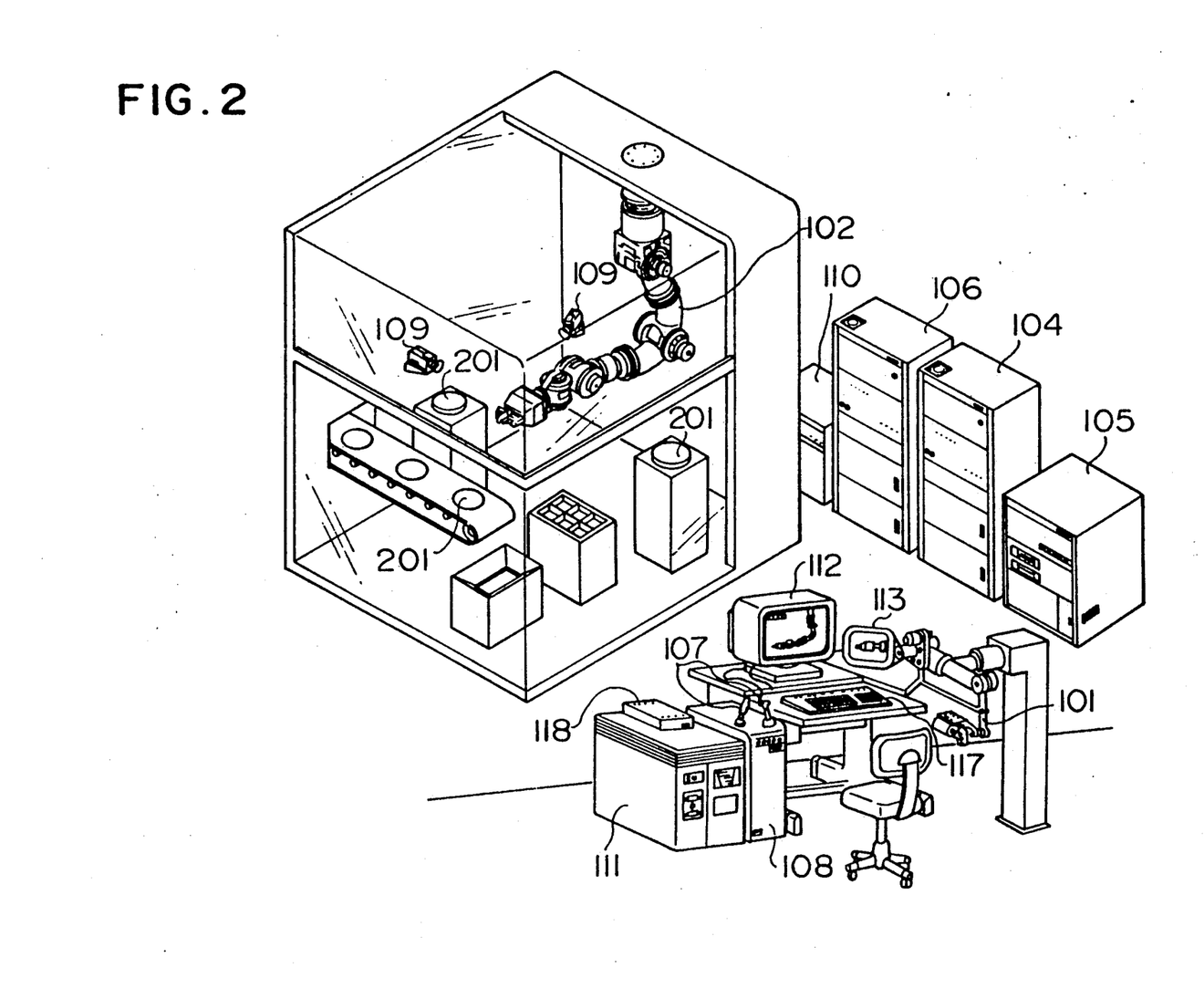
FIG. 2 is a perspective view showing the configuration of the manipulator control system.

Referring next to FIG. 2, description will be given of an embodiment of an apparatus according to the present invention.

In this diagram, 101 and 102 respectively indicate a master arm and a slave arm, which are configured in the difference shapes. Reference numeral 105 is a central processing apparatus for effecting operations such as a coordinate transformation and control of the master and slave arms.

The system further includes an additional transformation coupler 118 for adding a coordinate transformation, same as K of the equation (2), partially just explained above, based on an input supplied from a keyboard so as to supply an instruction to add a coordinate transformation represented by the equation (1) to the central processing apparatus 105. This coordinate transformation can be included in the second generalized world coordinate transformation.

Reference numeral 104 indicates an input/output device for the master arm 101 for effecting operations such that angles of the respective joints of the master arm 101 is inputted to the central processing apparatus 105 and the instruction value from the central processing apparatus 105 to the master arm 101 is outputted for driving actuators associated with the respective joints of the master arm 101. Reference numeral 106 indicates an input/output device for the slave arm 102 for effecting operations such that angles of the respective joints of the slave arm 102 is inputted to the central processing apparatus 105 and the instruction value from the central processing apparatus 105 to the slave arm 102 is outputted for driving actuators associated with the respective joints of the slave arm 102.

Reference numeral 107 denotes a joy stick for producing instruction values to the master arm 101 or slave arm 102 depending on the change-over effected in the central processing apparatus 105 and to an animation image, which will be described later. Numeral 108 indicates an input/output device for the joy stick 107 to effect functions such that signals including a signal of an inclination of the joy stick 107 are supplied to the central processing apparatus 105 and that a servo amplification is conducted on a force feedback signal from the central processing apparatus 105 to the joy stick 107, thereby driving the actuator of the joy stick 107.

Reference numeral 109 designates an image input device to be used to monitor operations of the slave arm 102 from various directions. Numeral 110 indicates an image processor in which operations such as a fast Fourier transform (FFT) are accomplished on an image inputted by means of the image input device 109 so as to conduct operations, for example, a pattern identification.

Reference numeral 111 designates an animator simulator including a computer for animation to display the slave arm 103 as computer graphics in a realtime fashion. Numeral 112 indicates a graphic display for displaying an animation image produced by the animator simulator 111, for superimposing an animation image onto a real image inputted from the image input device 109 so as to display the resultant image, for displaying a menu, for example, for a mode change, and for displaying interactive output images for the man-machine interface with respect to the central processing apparatus 105 and the animator simulator 111. Reference numeral 113 indicates a television monitor for displaying an image from the image input device 109. Numeral 117 is a keyboard to be employed to input constants of a coordinate transformation and information of a base shift indication menu and to input interactive data for the man-machine interface with respect to the central processing apparatus 105 and the animator simulator 111.

Reference numeral 201 is a work object or an objective workpiece onto which the slave arm 102 is required to effect work in a broad range.

As As explained above, there are disposed a plurality of image input devices 109 so as to image the slave arm 102 from the respective directions; in consequence, when the operator handles the master arm 101 while visually checking the image on the television monitor 113, it is necessary for the operator to bear the correspondences between the master arm 101 and the directions in mind, which leads to a difficulty in the operations such as the parallel translation. In consequence, in order to overcome this difficulty, when attaining the slave arm coordinate transformation matrix $T_6^S$, assuming the coordinate transformation matrix for correcting the direction of the slave arm 102 with respect to the i-th image input device 109 to be represented by Ri, $T_6^S$ is obtained as, $$T_6^S = R_i \cdot K \cdot T_6^m \quad (3)$$

Based on an image displayed as a result of the operation above, the operator can handle the master arm without paying attention to the direction difference. (The actual movement of the slave arm 102 is conducted in association with $KT_6^m$.) In this expression, Ri·K is supplied from the additional transformation coupler 118.

Assuming here the roll angle, pitch angle, and yaw angle of the view direction are $\alpha_i$, $\beta_i$, and $\gamma_i$, respectively for the i-th image input device, Ri is represented as follows:

$$Ri = \begin{pmatrix} \cos\gamma_i \cos\beta_i & \cos\gamma_i \sin\beta_i \sin\alpha_i & \cos\gamma_i \sin\beta_i \cos\alpha_i & 0 \\ -\sin\gamma_i \cos\alpha_i & +\sin\gamma_i \sin\alpha_i & & \\ \sin\gamma_i \cos\beta_i & \sin\gamma_i \sin\beta_i \sin\alpha_i & \sin\gamma_i \sin\beta_i \cos\alpha_i & 0 \\ & +\cos\gamma_i \cos\alpha_i & -\cos\gamma_i \sin\alpha_i & \\ -\sin\beta_i & \cos\beta_i \sin\alpha_i & \cos\beta_i \cos\alpha_i & \\ 0 & 0 & 0 & 1 \end{pmatrix} \quad (4)$$

The $\alpha$, $\beta$, and $\eta$ obtained by measuring the directional difference of the master arm 101 by use of the i-th image input device 109 and stored in the additional transformation coupler 118 for using as a menu. When the number of the i-th image input device is inputted from the keyboard 117 to the additional transformation coupler 118, the corresponding coordinate transformation is added by the central processing apparatus 105. In this configuration, an operator could handle the master arm under watching to the i-th image input device 109 without paying attention to the directional difference. The above addition of the coordinate transformation as seen in the equation (3) is also called a second generalized world coordinate transformation.

By introducing the coordinate transformation matrix $R_i$ above, it is possible to supply the slav arm with information associated with the thermal deformation and deformation cause by inertia of the slave arm in the cosmos, which improves the operability. In a case of the object above, assuming that the roll angle, pitch angle, and yaw angle of the tip of the slave arm due to the arm deformation are $\delta$, $\epsilon$, and $\zeta$ and that the dislocated positions in the x, y, and z directions are p, q, r; R can be represented as $$R = \begin{pmatrix} \cos\zeta \cos\epsilon & \cos\zeta \sin\epsilon \sin\delta & \cos\zeta \sin\epsilon \cos\delta & p \\ -\sin\zeta \cos\delta & +\sin\zeta \sin\delta & & \\ \sin\zeta \cos\epsilon & \sin\zeta \sin\epsilon \sin\delta & \sin\zeta \sin\epsilon \cos\delta & q \\ & +\cos\zeta \cos\delta & -\cos\zeta \sin\delta & \\ -\sin\epsilon & \cos\epsilon \sin\delta & \cos\epsilon \cos\delta & r \\ 0 & 0 & 0 & 1 \end{pmatrix}$$

Next, referring to FIG. 1, description will be given of a flow of primary signals in this embodiment. Incidentally, although the degree of freedom is six for the master arm, the slave arm, and the joy stick in the actual case, the degree of freedom is assumed to be three for simplification in the following description.

Reference numerals 114A to 114C are position sensors arranged on the respective joint axes of the master arm 101. Signals from these sensors are processed by the master arm input/output device 104 so as to be fed to the central processing apparatus 105. Numerals 115A to 115C are position sensors arranged on the respective joint of the slave arm 102. Signals from these sensors are processed by the slave arm input/output device 106 so as to be fed to the central processing apparatus 105. Based on the signals above, the central processing apparatus 105 conducts a coordinate transformation into the generalized world coordinate and further achieves a coordinate transformation into the second generalized world coordinate based on an instruction from the additional transformation coupler 118, thereby determining specification values to the slave arm 102. These specification values are used through the slave arm input/output device 106 so as to drive actuators 116A to 116C disposed on the respective joints of the slave arm 102. At the same time, the central processing apparatus 105 sends the specification values to the animator simulator 111, thereby displaying an animation image of the slave arm 102 on the graphic display 112.

The configuration further includes position sensors 117A to 117C for detecting an inclination angle of the joy stick 107, and signals from these sensors are processed by the joy stick input/output device 108 so as to be supplied to the central processing apparatus 105. When determining specification values to the slave arm 102, the central processing apparatus 105 checks for a change-over signal from an external device so as to determine which one of signals from the master arm 101 and from the joy stick 107 is to be referenced.

In addition, the image inputted via the image input device 109 undergoes the fast Fourier transform and a pattern identification so as to display a real image on the television monitor 113, and the obtained image is sent to the animator simulator 111 such that the real image is superimposed on to an animation image on the graphic display 112 when necessary.

Figure 3:
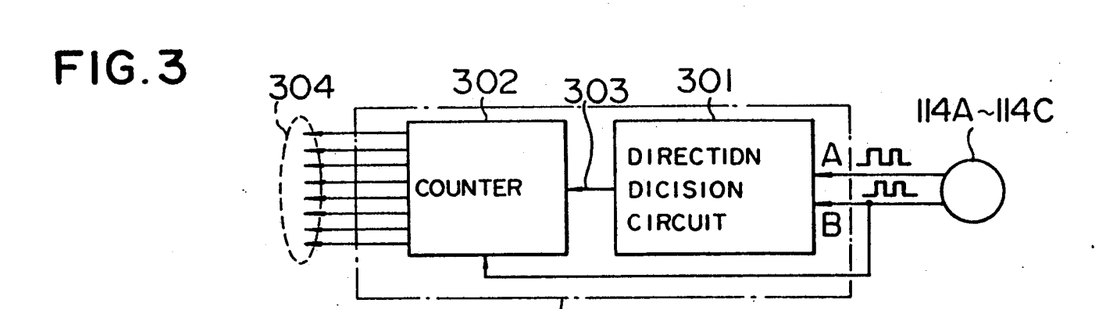
FIG. 3 is a block diagram showing a specific configuration example of a master arm input/output device 104.

Next, FIG. 3 shows a specific example of processing in which the signals from the position sensors 114A to 114C are processed in the master arm input/output device 104. This also applies to the processing associated with the signals from the joy stick 107 and from the slave arm 102. In FIG. 3, rotary pulse generators are employed as the position sensors 114A to 114C. From the position sensors 114A to 114C, there are generated a pair of pulse signals having a phase difference of 90°, namely, pulse signals having phases A and B, respectively depending on the rotary angle of the rotary pulse generator. These signals are fed to a direction decision circuit 301 so as to undergo a direction decision of the rotary angles. On the other hand, the signal with the phase A or B is delivered to a counter 302 to count the number of pulses. The direction decision circuit 301 produces a direction signal 303, which is fed to the counter 302 so as to change-over between incrementation and decrementation of the pulse count. In consequence, since the value of the counter 302 increases and decreases in association with the incrementation and the decrementation of the rotary angle, it is possible to detect the rotary angle by reading the output produced by the counter 302 from an external device.

Figure 4:
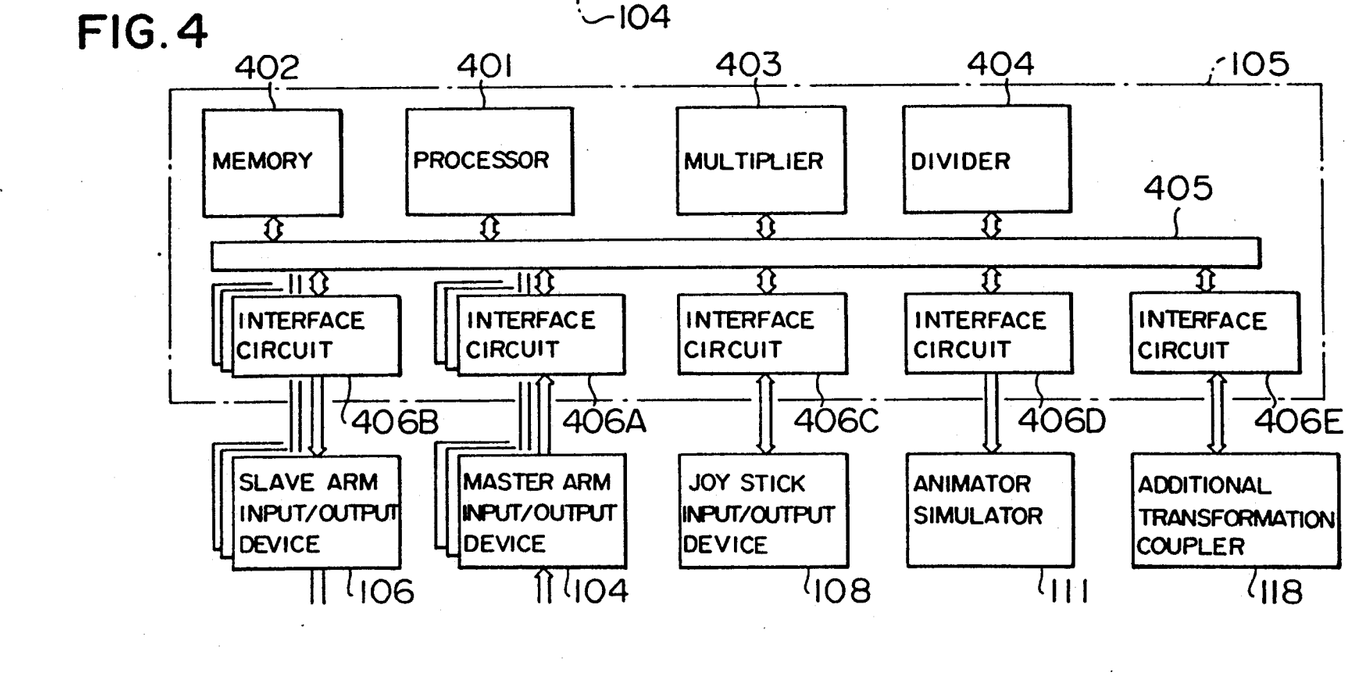
FIG. 4 is a block diagram showing a concrete configuration example of a central processing apparatus 105.

FIG. 4 shows a specific configuration example of the central processing apparatus 105, which includes a processor 401 effecting operations such as data input/output control and addition/subtraction, a memory 402 for storing therein data such as a trigonometric function table and link parameters of the manipulator, a multiplier 403, and a divider 404. These constituent elements are connected with each other by means of a bus circuit 405. In addition, the bus circuit 405 is connected to serial or parallel interface circuits 406A to 406E, which are linked to the respective arm input/output devices 106 and 108, the animator simulator 111, and the additional transformation coupler 118. The processor 401 can access any devices connected to the bus circuit 405 so as to process data related thereto.

Next, description will be given of operations of an embodiment of the apparatus above according to the present invention.

Figure 1:
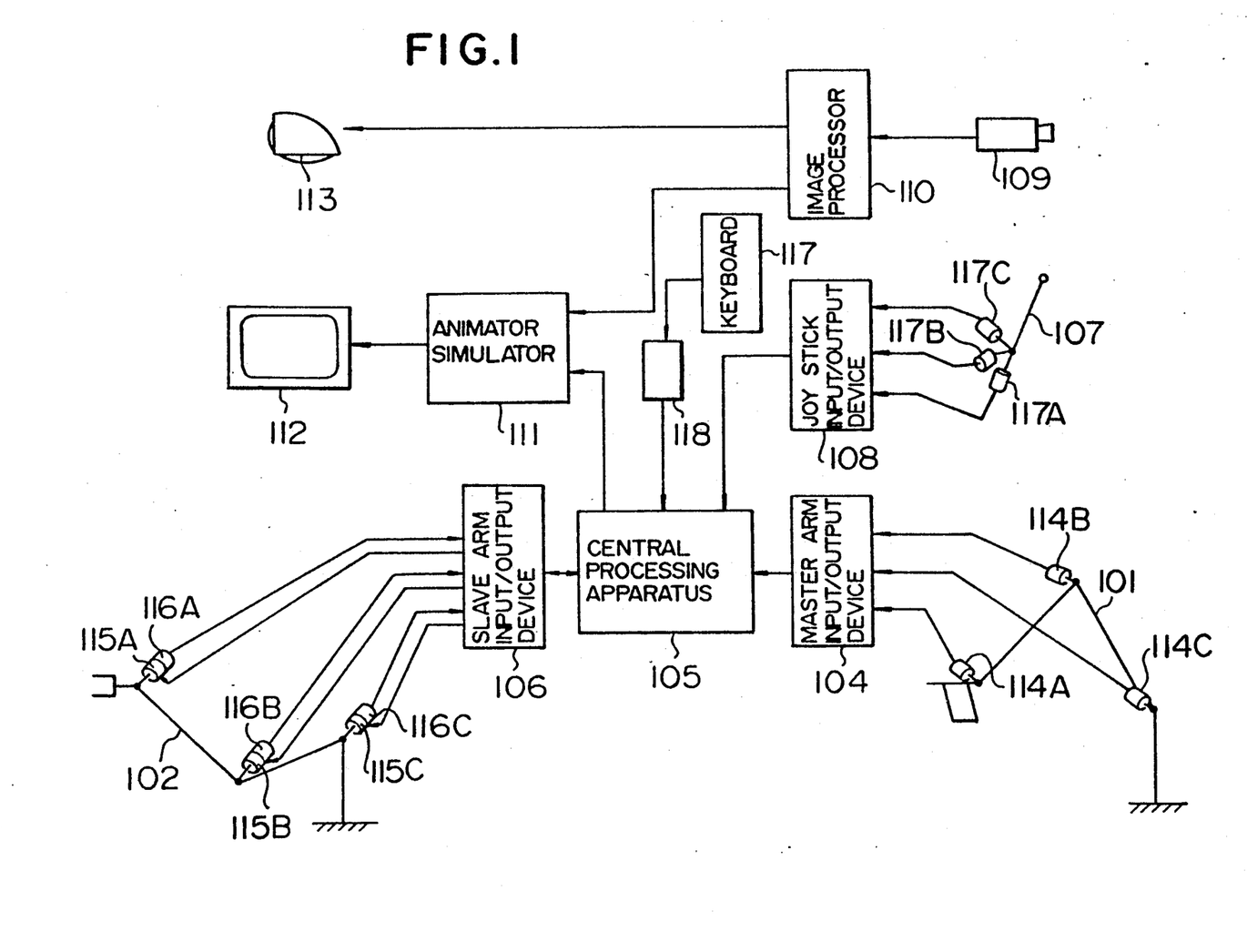
FIG. 1 is a block diagram schematically showing a manipulator control system as an embodiment according to the present invention.

When the master arm 101 is operated, the joint angles of the master arm 101 are respectively sensed by the position sensors 114A to 114C, as shown in FIG. 1. The sensed signals are sent via the master arm input/output device 104 to the central processing apparatus 105. In the central processing apparatus 105, there is stored the coordinate transformation matrix $T_6^m$ representing relative positional relationships of the coordinate system MC at the tip of the master arm 101 to the master arm rectangular coordinate system M of FIG. 5, and hence there is conducted a coordinate transformation for the representation of the first generalized world coordinates. In addition, based on an input supplied from the keyboard 117, the additional transformation coupler 118 stores the matrix $R_j^K$ which represents coordinate transformation constants between the movement of the tip of the slave arm 102 and that of the tip of the master arm 101 including removal of the directional difference according to a plurality of image input devices and the shift amount of the reference point of the tip of the master arm 101 as well as the shift amount of the reference point of the origin of the coordinate system SC of the tip of the slave arm 102, thereby instructing the central processing apparatus 105 an addition of the coordinate transformation representing of the second generalized world coordinate transformation. In this situation, the central processing apparatus 105 effects an arithmetic operation of $R_j^K$ on the master arm coordinate transformation matrix $T_6^m$ so as to attain the slave arm coordinate transformation matrix $T_6^S$. Subsequently, the system effects an inverse coordinate transformation to attain the coordinate values of the respective joints of the slave arm 102 in a state where the relative position of the coordinate system SC at the tip of the slave arm 102 with respect to the slave arm rectangular coordinate system S matches with the slave arm coordinate transformation matrix $T_6^S$, thereby supplying the resultant coordinate values to the slave arm input/output device 106. The slave arm input/output device 106 then drives the actuators 116A to 116C. Through the operations above, the movement of the tip of the master arm 101 can be subjected to a scale transformation and/or a parallel translation and/or direction transformation so as to accordingly cause the movement of the tip of the slave arm 102. As a result, within the movable ranges of the respective arms, the movement of the master arm 101 can be arbitrarily changed so as to be transferred to the slave arm 102 regardless of the shapes of the respective arms, and/or image input device 109 namely, in association with the operation of the master arm 101, and the slave arm 102 can be moved in a fine action or in a coarse and great movement without causing any danger.

Moreover, in response to an instruction from the additional transformation coupler 118 responsive to an input from the keyboard 117, the central processing apparatus 105 temporarily separates the slave arm 102 from the master arm 101 into a stationary state such that the operator moves only the master arm 101 to a desired position. In this state, the additional transformation coupler 118 stores again the amount of the shift between the master arm 101 and the slave arm 102 in the elements d, e, and f of the equation (2) such that depending on an input from the keyboard 117, the master arm 101 and the slave arm 102 are again set in an associated operation so that the operation reference point of the slave arm 102 can be arbitrarily set again based on the master arm 101, which enables the operator to move the master arm 101 in a state where the operation is facilitated.

On the other hand, the signals from the position sensors 117A to 117C of the joy stick 107 are supplied via the joy stick input/output device 108 to the central processing apparatus 105. The central processing apparatus 105 in turn integrates the signals with respect to time so as to store a coordinate transformation matrix $T_6^j$ representing the relative positional relationship of the coordinate system JC virtually set for the tip of the gripper of the joy stick 107 with respect to the joy stick reference coordinate system J. Thereafter, when computing $T_6^S$ above, by using $T_6^j$ in place of $T_6^m$ in response to a change-over signal from an external device, the slave arm 102 can be moved by operating the joy stick 107 as shown in FIG. 1.

The master arm 101 issues a position instruction to the slave arm 102 and the joy stick 107 issues an instruction of a velocity instruction to the slave arm 102, which consequently enables the operator to select an easy operation depending on the situation.

Also in a case where the joy stick 107 is employed, there is obtained an advantage, for example, that the velocity of the movement of the slave arm 102 when the joy stick is inclined can be arbitrarily set by means of the scale transformation.

In addition, by outputting the second generalized world coordinates, namely, $KT_6^m$ of the equation (2) to the animator simulator 111 in place of the slave arm input/output device 106 or to these components 111 and 106 at the same time, an animation image can be displayed on the graphic display 112. By displaying the animation image without moving the slave arm 102, it is possible to confirm the operation associated with an effect, for example, of a scale transformation, and hence there cannot appear a dangerous situation.

Moreover, in a case where a slave arm located in the cosmos is operated by an operator on the earth, due to the delay in the communication with respect to time, the operator can visually check the image earlier than the actual slave arm, which hence enables a wrong operation of the master arm to be corrected by checking the image. If it is desired to recognize the actual movement of the slave arm, the animation image need only be displayed with a delay of time in the communication.

Furthermore, in a case where the animation image is displayed immediately when the slave arm 102 is moved, since the animation display can be effected for images viewed from arbitrary directions, the operability is improved.

In addition, the image inputted by means of the image input device 109 can be used not only for the display on the television monitor 113 but also for a display produced by superimposing the image on to the animation image on the graphic display 112. With this provision, there is obtained further specific image information; moreover, since a portion of an image which is covered and is concealed by an object located in front thereof in the actual image can be displayed in the animation image, the real image and the animation image can function complementarily to each other.

Incidentally, the additional transformation coupler 118 in this case is required to determine the transformation matrix $R_j^K$ to obtain the second generalized world coordinates such that the animation image is not shifted from the real image.

Figure 5:
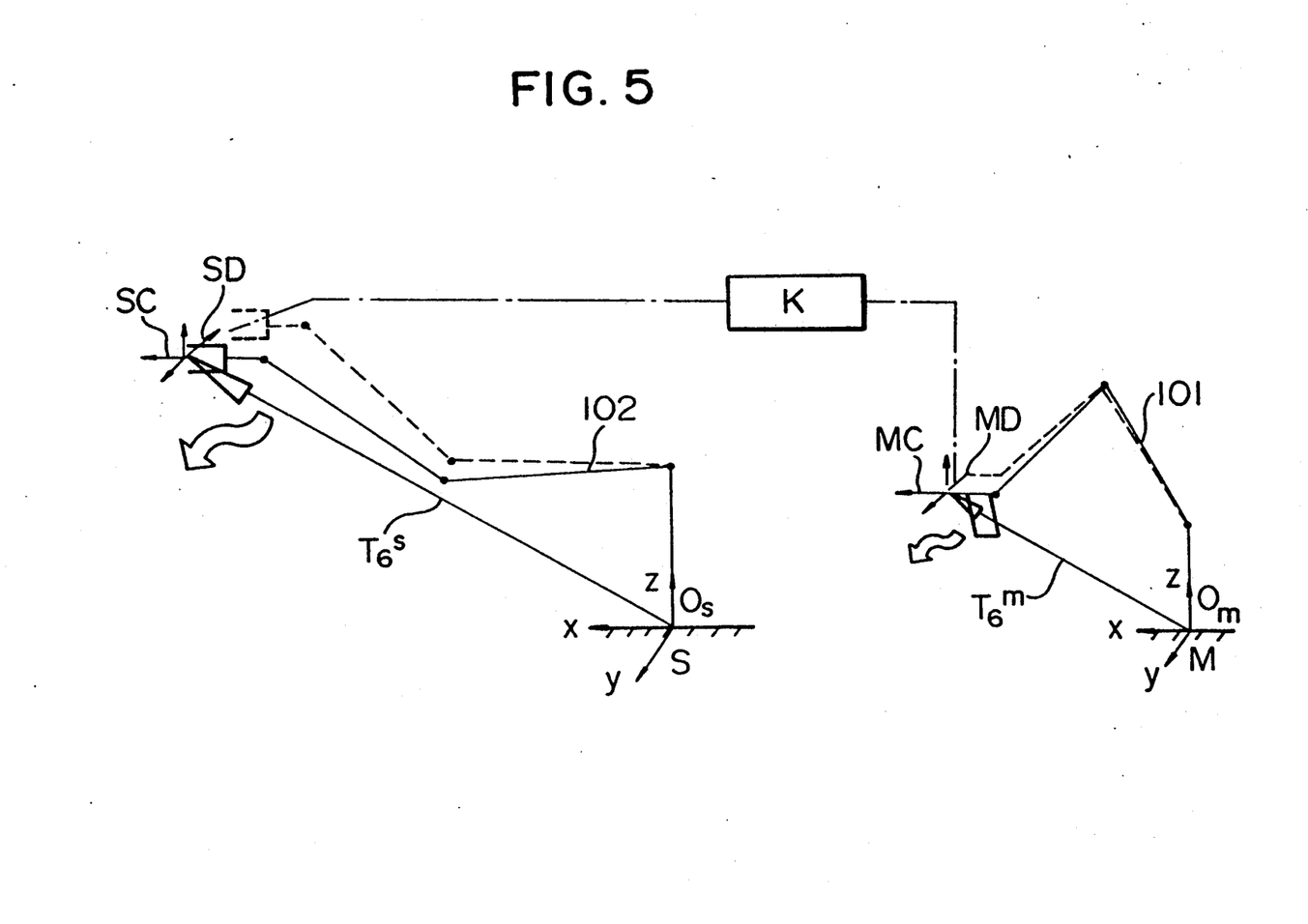
FIG. 5 is an explanatory diagram useful to explain an operation principle according to the present invention.

Referring next to FIG. 5, description will be given of an alternative embodiment according to the present invention. In this embodiment, in place of a coordinate transformation effected for an infinitesimal change in the position of the tip of the master arm 101, the infinitesimal change is transferred to the slave arm 102 as an infinitesimal change in the position of the tip of the slave arm 102. Like in the embodiment of FIG. 1, assume here that the rectangular coordinate system of the master arm 101 is M, that the coordinate transformation matrix from the rectangular coordinate system M to the tip of the master arm 101 is $T_6^m$, and that the transformation matrix for the scale transformation and the like is K. In addition, assuming the rectangular coordinate transformation matrix of the slave arm 102 to be $T_6^m$, the procedure of the coordinate transformation is as follows. That is, the coordinate transformation matrix $T_6^m$ can be obtained from the respective of link and the angles of the respective joint of the master arm 101. Furthermore, when the respective link parameters of the slave arm 102 and the coordinate transformation matrix $T_6^S$ indicating the position of the tip of the slave arm thereof are supplied, there can be obtained the coordinate values of the respective joint of the slave arm 102.

Assuming now that at a point of time, the movement of the master arm 101 is synchronized with that of the slave arm 102, there exists the following relationship between the infinitesimal change $dT_6$ in the position of the tip of the gripper and the infinitesimal change $dQ$ of each shaft of the manipulator.

$$dT_6 = JdQ \qquad (5)$$

(J: Jacobian matrix)

Assuming now that when the master arm 101 undergoes an infinitesimal movement MD, the change in the displacement of each joint axis thereof is $dQ^m$ and that the Jacobian matrix of the master arm 101 is $J^m$, the infinitesimal movement $dT_6^m$ of the tip of the gripper of the master arm is obtained from the following equation.

$$dT_6^m = J^m \cdot dQ^m \qquad (6)$$

By achieving a scale transformation on $dT_6^m$, the infinitesimal movement $dT_6^S$ of the tip of the slave arm 102 is obtained as follows.

$$dT_6^S = KdT_6^m \qquad (7)$$

Next, by solving the inverse matrix $(J^S)^{-1}$ of the Jacobian matrix $J^S$ of the slave arm 102, the infinitesimal displacement $dQ^S$ of each joint of the slave arm 102 is attained as follows.

$$dQ^S = (J^S)^{-1} \cdot dT_6^S \qquad (8)$$

The infinitesimal displacement $dQ_S$ of each joint of the slave arm 102 is added to the position of the pertinent joint shaft of the slave arm 102 so as to set the resultant values as the coordinate values for the servo control circuit associated with the joints.

Figure 6:
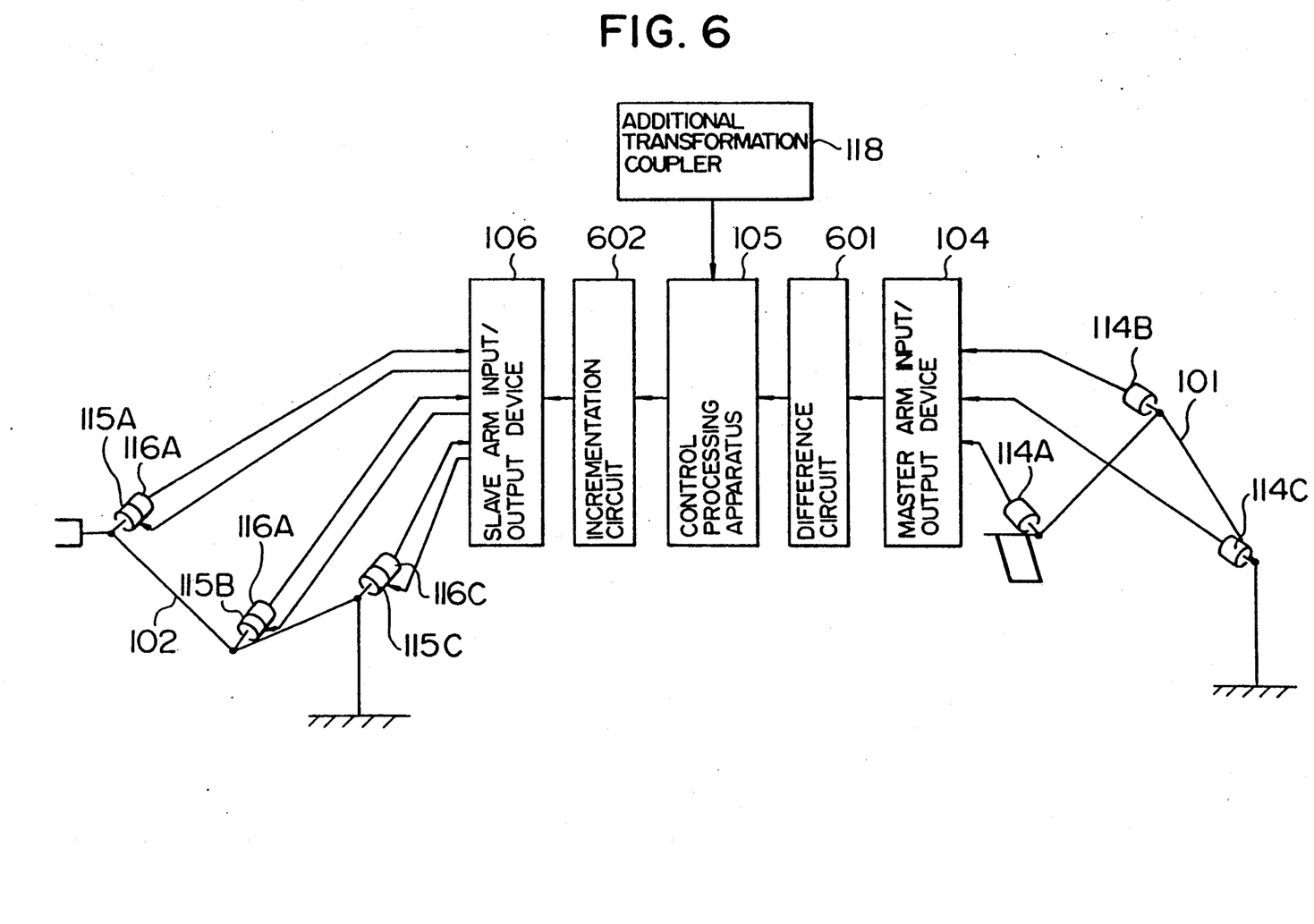
FIG. 6 is a block diagram showing a manipulator control system as an alternative embodiment according to the present invention.

Referring now to FIG. 6, description will be given of an alternative embodiment of the control apparatus according to the present invention based on the principle above. Incidentally, since the joy stick 107, the image input device 109, and the animator simulator 111 are operated in the similar fashion to that of the first example, the description will be here given only of operations related to the master arm 101 and the slave arm 102.

In FIG. 6, the constituent elements assigned with the same reference numerals of FIG. 1 correspond to the same or equivalent components. The configuration includes a difference circuit 601 and an incrementation circuit 602. The difference circuit 601 detects a variation in each of the signals from the sensors 114A to 114C in the sampling time. The central processing apparatus 105 conducts computations represented by the expressions (3) to (6) to attain changes in the values of the respective joint of the slave arm 102 and then delivers the change values to the incrementation circuit 602. The incrementation circuit 602 in turn adds the received values to the present coordinate values of the respective joint of the slave arm 102 so as to send the resultant values to the slave arm input/output device 106, which drives the actuators 116A to 116C arranged on the respective joint of the slave arm 102. As a result, the slave arm 102 is driven and the amount of movement is detected by the detectors 115A to 115C so as to be fed back to the slave arm input/output device 106, which consequently enables the movement of the tip of the master arm 101 to be transferred through a scale transformation to the slave arm 102.

Figure 7:
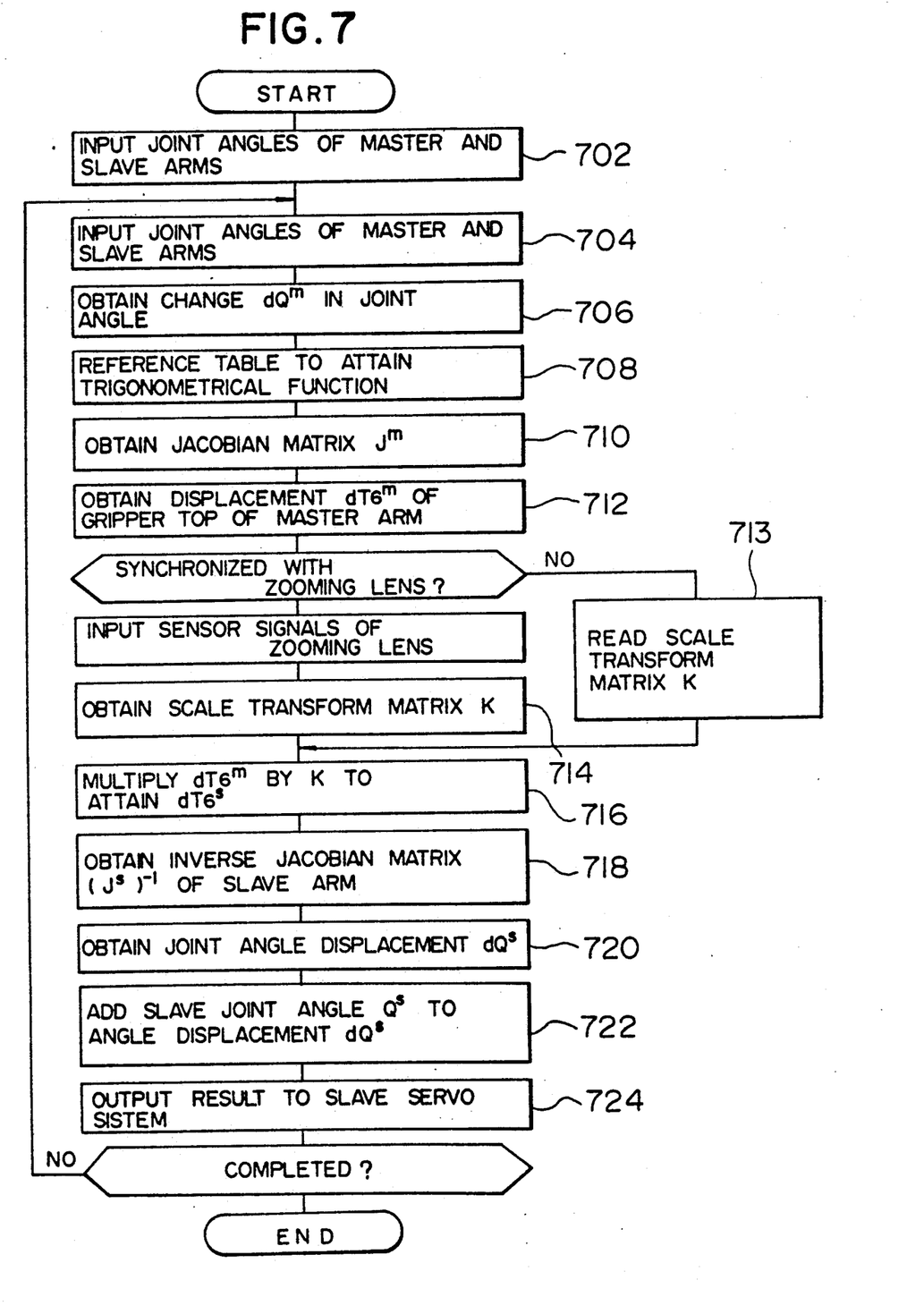
FIGS. 7 and 8 are flowcharts showing arithmetic processing operations.

Referring to FIG. 7, description will be given of the arithmetic processing operation of the arithmetic circuit in an alternative embodiment of the control apparatus according to the present invention.

First, when the system is started in the initial state, the sum of the initial value of the angle of the respective joint of the master arm 101 $Q_o^m$ is inputted (702). Next, the sum of the joint angle of the master arm 101 $Q_o^m$ and the slave arm 102 is obtained (704) to compute the variation $dQ^m$ of the joint angle based on the difference with respect to the previous data (706). Thereafter, referencing the table, a trigonometirical function is attained (708) to compute the Jacobian matrix $J^m$ of the master arm 101 (710). From the joint angle variation $dQ^m$ and the Jacobian matrix $J^m$ thus determined, there is obtained the displacement $dT_6^m$ of the tip of the master arm 101 (712). In a case where a synchronization is established with respect to the zooming lens of the image, the scale transformation constant K is attained by use of the inputted data (714). When the sign of zooming lens is not required, the system employs the scale transform matrix K previously prepared in a memory (713). The displacement $dT_6^m$ of the tip of the master arm 101 is multiplied by K to obtain the displacement $dT_6^S$ of the tip of the slave arm 102 (716). Next, the system computes the inverse Jacobian matrix $(J^S)^{-1}$ of the slave arm 102 (718). Thereafter, $(J^S)^{-1}$ is multiplied by $dT_6^S$ to determine the joint angle displacement $dQ^S$ for each joint of the slave arm 102 (720), and then the system computes the sum of the joint angle $Q^S$ and $dQ^S$ (722) to output the results to the respective servo systems of the slave arm 102 (724). The procedure above is repeatedly effected until the operation of the apparatus is terminated.

According to this embodiment, there is developed the similar effect to that obtained by the embodiment of FIG. 1; furthermore, regardless of the position to be taken by each tip of the master arm 101 and the slave arm 102, it is possible to effect a synchronized start therebetween, and there can be achieved an arbitrary scale transformation.

Figure 9:
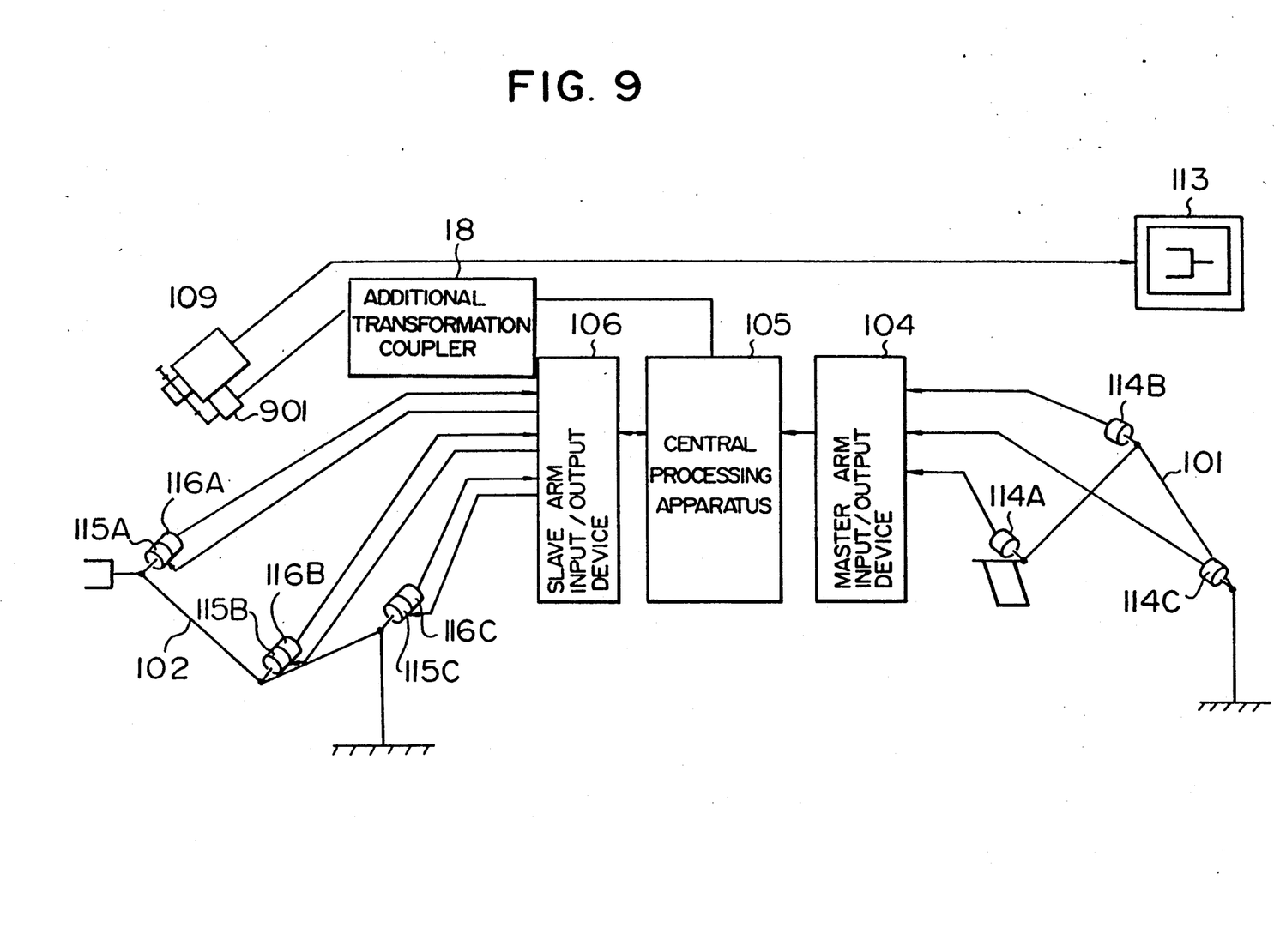
FIG. 9 is another block diagram showing a manipulator control system as an alternative embodiment according to the invention.

FIG. 9 shows an alternative embodiment of the apparatus according to the present invention in which the components assigned with the same reference numerals as those of FIG. 1 indicate the same elements. In this embodiment, in association with a variation in the zooming ratio of the image input device 109 imaging the tip of the slave arm 102, the system changes a constant of the scale transformation for the movement of the slave arm 102 with respect to the movement of the master arm 101, and the image input device 109 is provided with a sensor 901 for detecting the movement of the zoom lens thereof so as to supply the sensed information item to the additional transformation coupler 118. By the calibration of the sensed information, the scale transformation matrix K is attained. The additional transformation coupler 118 instructs an addition of the coordinate transformation to the central processing apparatus 105 in the similar fashion described above. In response thereto, the central processing apparatus 105 effects arithmetic operations to compute coordinate values for the scale transformation to be conducted between the movements of the slave arm 102 and the master arm, respectively.

The configuration of FIG. 9 includes a television monitor 113.

Figure 8:
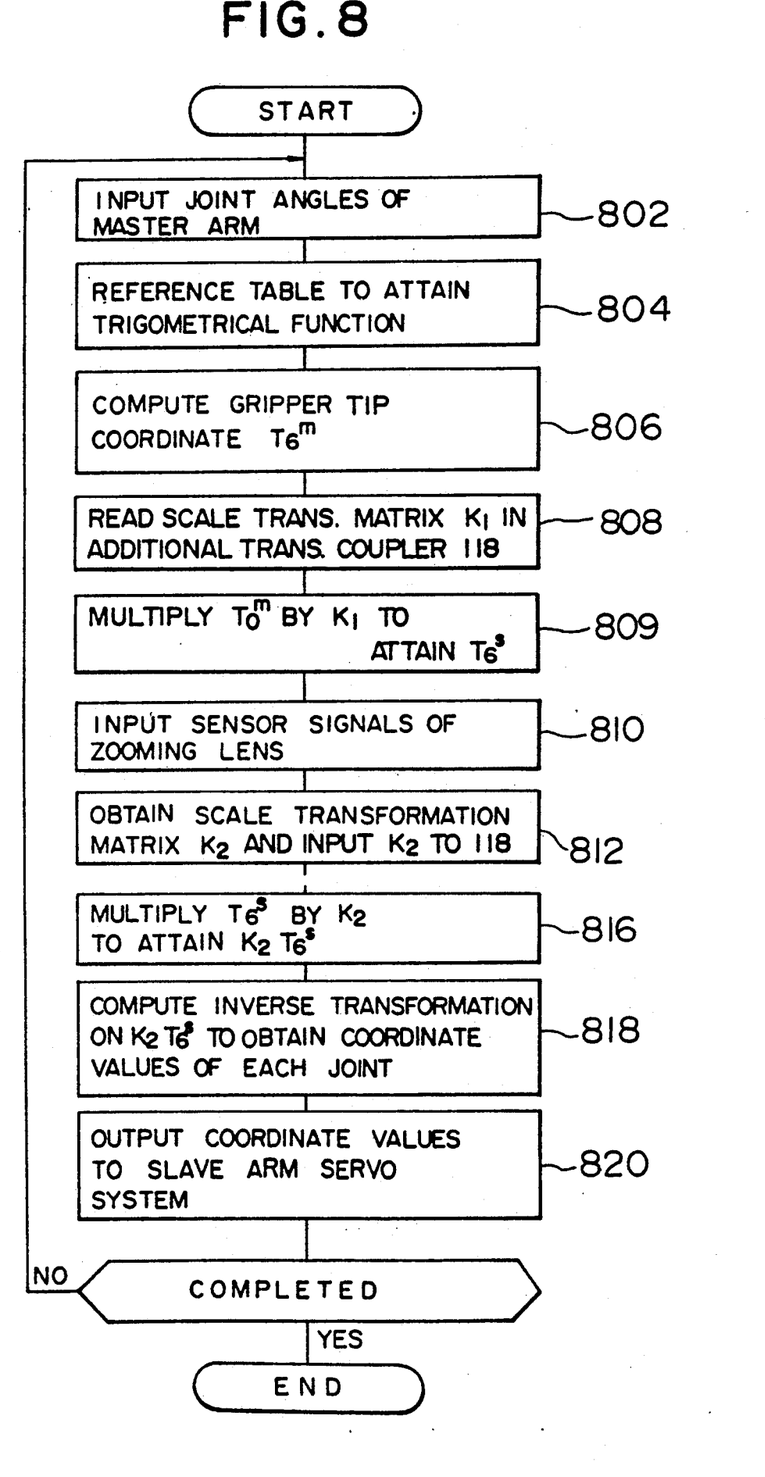

Referring now to the flowchart of FIG. 8, description will be given of operations of an alternative embodiment of the apparatus according to the present invention.

First, when the system is started in the initial state, the joint angles of the master arm 101 are inputted (802). Next, referencing the table, values of a trigonometric function are attained (804). Based on the obtained values, the system then computes the coordinate $T_6^m$ the tip of the master arm (806). As described above, the matrix $K_1$ is read by the additional transformation coupler 118 (808) and is multiplied on the gripper tip coordinate $T_6^m$ so as to attain $T_6^S$ (809). Then, as described above the zooming ratio is detected by means of the sensor 901 attached onto the zooming lens (810) and then the scale transformation matrix $K_2$ is determined (812). Subsequently, the tip position $T_6^m$ of the master arm 101 is multiplied by $K_2$ to compute the tip position $T_6^S$ of the slave arm 101 (816). Thereafter, $T_6^S$ undergoes an inverse coordinate transformation to determine coordinate values of each joint of the slave arm 102 (818) and then the resultant values are sent to the respective servo systems of the slave arm 102 (820). The procedure above is repetitiously conducted until the system operation is completed.

With the constitution of the apparatus above, even when the zooming ratio of the image input device 109 is arbitrarily altered, it is possible to keep the ratio unchanged between the movement of the gripper tip of the master arm 101 and that of gripper tip of the slave arm 102 displayed on the television monitor 113. As a result, there is attained a satisfactory sense of operation and hence the operability is improved.

While particular embodiments of the invention have been shown and described, it will be obvious to those skilled in the art that various changes and modifications may be made without departing from the present invention in its broader aspects.

We claim:

1. A manipulator control system comprising:
   (a) a master arm including a plurality of first links sequentially connected by joints;
   (b) a slave arm including a plurality of second links sequentially connected by joints;
   (c) an operational panel having means for generating operating signals for adjusting the operability of said master arm;
   (d) a plurality of controllers for effecting movement control of said slave arm by following a movement of said master arm;
   (e) first transform means connected to said controllers for transforming information of positions of said master arm into first generalized world coordinates associated with instructive positional information of said slave arm based on an initial relative positional relationship between said master arm and said slave arm;
   (f) second transform means for receiving the operating signals of said operation panel and the first generalized world coordinates supplied form said first transform means so as to transform the first generalized world coordinates into second generalized world coordinates for selectively establishing a change in a relative positional relationship between said master arm and said slave arm; and,
   (g) inverse transform means for receiving as an input the second generalized world coordinates so as to determine coordinate values of the joints of the slave arm.

2. The manipulator control system according to claim 1 further comprising:
   a plurality of image input devices each for obtaining an image of said slave arm; and
   change-over means for selecting an arbitrary one of said plurality of image input devices wherein based on information about a direction with respect to said slave arm, said image input device is selected by use of said change-over means, and said second transform means transforms the first generalized world coordinates into the second generalized world coordinates.

3. A manipulator control system according to claim 1 wherein said controllers include:
   control means for stopping the movement of said slave arm in response to a signal instructing an interruption of an operation of said slave arm following said master arm;
   means for effecting a coordinate transformation to correct an amount of the movement of said slave arm in association with an amount of a positional shift achieved by said master arm while said slave arm is in a stopped state; and
   control means for restarting an operation of said slave arm in response to a signal indicating a restart of the operation of said slave arm following said master arm.

4. The manipulator control system according to claim 1 further comprising:
   joy stick means disposed together with said master arm for generating an operation positional signal;
   control means for effecting control in response to a signal to select either one of said master arm and said joy stick means so as to cause the movement of said slave arm to follow either one of the movements of said master arm and said joy stick means; and
   means connected to said control means for effecting a transformation of the first generalize world coordinates in response to the selection signal.

5. A method of controlling a manipulator in a master/slave apparatus having an operation arm and a manipulator operating in association with a movement of the operation arm comprising the following steps of:
   setting an origin to establish a one-to-one correspondence between the operation arm and the manipulator so as to transform positional information of the operation arm and the manipulator into generalized world coordinates;

effecting a first coordinate transformation to match an origin of a generalized world coordinate with an origin of the operation arm and an origin of the manipulator to effect a coordinate transformation to attain instruction values of each axis so as to operate the manipulator;

effecting a second coordinate transformation to transform the first generalized world coordinates into second generalized world coordinates by an outside signal indicating a change in a positional effect of the operation arm to the manipulator and keeping the one-to-one correspondence between the operation arm and the manipulator; and controlling the manipulator in response to the second generalized world coordinates.

6. A method of controlling a manipulator according to claim 5 wherein said effecting a second coordinate transformation further includes a step for achieving a display of the second generalized world coordinates to conduct an animation.

7. The manipulator control method according to claim 6 wherein said step for achieving a display of the second generalized world coordinate to conduct an animation further includes a step for superimposing the animation onto a real image obtained through an image input device.

8. A method of controlling a manipulator according to claim 5 wherein said step of effecting a second coordinate transformation further includes a step operative to effect a display on an image display by achieving a change-over between two or more image input devices for transforming the first generalized world coordinates into the second generalized world coordinates in association with a direction of an arrangement orientation of each of the image input devices.

9. A method of controlling a manipulator according to claim 5 wherein the first generalized world coordinates are transformed into the second generalized world coordinates depending on a zooming ratio of an image input device.

10. A manipulator control method according to claim 5 further including a step for integrating with respect to time a velocity instruction issued from each said operation arm to produce a virtual position information.

* * * * *